(12) United States Patent
Chen et al.

(10) Patent No.: US 7,301,116 B2
(45) Date of Patent: Nov. 27, 2007

(54) PROGRAMMED ELECTRODE WEAR COMPENSATION DEVICE AND METHOD FOR 3D EDM SCANNING APPARATUS

(76) Inventors: Chin-Hui Chen, No. 124, Ton Ming Road, Dah-Chya Chen, Taichung Hsien (TW); Jui-Kuan Lin, No. 130 Lane 65, Chen Ping Road, Taichung City (TW); Ching-Cheng Yang, No. 2, Lane 15, Sec. 2, Ta Ching Street, Taichung City (TW); Ming-Ji Chen, No. 136, Yuan Shi Road, Yuan Chrang, Shiang, Yunlin Hsien (TW)

( * ) Notice: Subject to any disclaimer, the term of this patent is extended or adjusted under 35 U.S.C. 154(b) by 0 days.

(21) Appl. No.: 11/076,243

(22) Filed: Mar. 8, 2005

(65) Prior Publication Data

US 2006/0138092 A1 Jun. 29, 2006

(51) Int. Cl.
*B23H 7/20* (2006.01)
(52) U.S. Cl. .................. 219/69.16; 219/69.2; 700/162

(58) Field of Classification Search ................ 700/162, 700/182; 219/69.16, 69.2, 69.17
See application file for complete search history.

(56) References Cited

U.S. PATENT DOCUMENTS

| | | | | |
|---|---|---|---|---|
| 5,354,961 A * | 10/1994 | Diot et al. | .................. | 219/69.2 |
| 5,763,843 A * | 6/1998 | Yuzawa et al. | .......... | 219/69.16 |
| 5,919,380 A * | 7/1999 | Magara et al. | ........... | 219/69.16 |
| 6,184,486 B1* | 2/2001 | Diot et al. | .................. | 219/69.2 |
| 6,642,470 B2* | 11/2003 | Tricarico et al. | ......... | 219/69.16 |

* cited by examiner

*Primary Examiner*—Geoffrey S. Evans

(57) ABSTRACT

A programmed electrode wear compensation device and method for 3D EDM scanning apparatus has a compensation device which receives raw data about a working path of a working apparatus from a CAD/CAM device, calculates therefrom compensated data which take into account electrode wear and transmits the compensated data to a control device which controls the working apparatus, so that smoothness and shape of a machined surface are maintained during electric discharge.

8 Claims, 10 Drawing Sheets

PROGRAMMED ELECTRODE WEAR COMPENSATION DEVICE AND METHOD FOR 3D EDM SCANNING APPARATUS

BACKGROUND OF THE INVENTION

1. Field of the Invention

The present invention relates to a programmed electrode wear compensation device and method for a 3D EDM scanning apparatus, particularly to a programmed electrode wear compensation device and method used in conjunction with a 3D EDM scanning apparatus, which ensures that smoothness and shape of a machined surface are maintained during electric discharge.

2. Description of Related Art

Machining by electric discharge is a working method which is slow, but applicable to working hard materials or alloys, which are usually difficult to work, and which is mainly used for generating micro-sized forms or cuts, with dimensions ranging from dozens of micrometers to several millimeters.

Referring FIGS. 10 and 11, in conventional art, wire electric discharge grinding (WEDG), structures as shown in FIGS. 10 are made by an arrangement as follows: A workpiece 71 is worked by a running wire 72 which is guided by a wire guide 73. Working is performed by arranging a micro-sized electrode and is milling layers with the electrode by electric discharge. During working, however, the electrode undergoes wear, which needs to be tracked and compensated to maintain plane surfaces and homogeneous milling depths as well as to preserve smooth surfaces. Due to working, electrodes are usually not flat and become shorter over time, so that worked surfaces are not even and milling depths are not reached. Using small electrodes that run along linear tracks to work relatively large areas without compensating for wear results in uneven worked surfaces. Therefore, proper tracking and wear compensation are indispensable in EDM scanning.

Research has established relations between material, shape, dimensions, energy of discharge, working paths and electrode wear. In practice, however, working is still performed by individual judgement of users without clear rules. Generally, electrode wear is compensated only when proceeding to another layer. Programming support for EDM is provided only by regular computer aided manufacturing (CAM) and complemented by the experience of the user.

Conventional art is summarized as follows:

1. Taiwan patent publication no. 520311 "Method for working holes with uniform depths by automatic compensation of electrode wear" teaches an automatic calculation of electrode wear, which is compensated in working subsequent holes. Although this method results in increased effectiveness of working, it is only applicable to working holes.
2. U.S. Pat. No. 4,301,349 "Electrical machining apparatus for forming a three-dimensional surface contour in a workpiece" teaches a wire oscillating at high frequency, so that continuously changing sections of the wire are used for working to eliminate effects of wear.
3. U.S. Pat. No. 4,386,248 "Electrical machining method and apparatus for forming a 3D surface contour in a workpiece with a travelling wire electrode" teaches a continuously running wire as discharge electrode, so that changing sections of the wire are used for working to eliminate effects of wear.
4. U.S. Pat. No. 5,354,961 "Device and process for electrical-discharge machining of a three-dimensional cavity with a thin rotating tool electrode" discloses a controller which calculates wear and change of shape of a tool electrode and measures and adjusts the length of the electrode. The controller calculates volume changes, which possibly are not correct. Working paths are not controlled, so that working time is wasted.
5. U.S. Pat. No. 6,454,930 "Procedure and device for the three-dimensional processing of a work piece by means of electroerosive or electrochemical machining" discloses a device moving with five degrees of freedom and working a workpiece by electroerosive or electrochemical machining. An angle between the workpiece and an electrode is adjustable, allowing for angular compensation between different layers. Working depths are small, and working and sensing are done simultaneously, which slows down working and increases manufacturing cost.
6. U.S. Pat. No. 6,531,036 "Fabrication of micron-sized parts from conductive materials by silicon electric discharge machining" teaches an electrode which is made by engraving semiconductor material and depositing a metal layer thereon and used in conjunction with CAD/CAM for working plane surfaces. Therein, a microelectronic process and electric discharge are used for CAD/CAM working.
7. U.S. Pat. No. 6,642,470 "Process and device for machining a three-dimensional piece by electroerosive milling" teaches a manufacturing process in which a regulation module compensates for electrode wear by simulation thereof and comparison with an actual electrode position. Compensation rules, however, are complicated, so that handling is difficult. Furthermore, crossing of working path sections is not taken into consideration.

Similar to conventional milling, conventional working by electric discharge is performed-using procedures and parameters that are the result of experience. Material, dimensions, roughness of surfaces and user experience decide on working parameters like waveform, voltage and computing parameters. Usually, a groove is made by clearing away material layer by layer, with plane of worked surfaces being determined by working paths and compensation of electrode wear. Optimal speed of working depends on electrode wear and is decided by experience. So far there is no CAD/CAM technique on the market that considers working paths. Any working program still has to overcome this problem.

SUMMARY OF THE INVENTION

It is the object of the present invention to provide a programmed electrode wear compensation device and method for a 3D EDM scanning apparatus.

The present invention is a programmed electrode wear compensation device and method for 3D EDM scanning apparatus has a compensation device which receives raw data about a working path of a working apparatus from a CAD/CAM device, calculates therefrom compensated data which take into account electrode wear and transmits the compensated data to a control device which controls the working apparatus, so that smoothness and shape of a machined surface are maintained during electric discharge.

The characteristics of the present invention include:

1. Raw data from a CAD/CAM device about a working path of a working apparatus are used and compensated for electrode wear.
2. A complete working path and process is calculated based on the raw data from the CAD/CAM device, yielding electrode wear, a process working path and a working result.

3. Stored parameters are easily modifiable according to case-by-case demands.
4. No modification of the control device beyond manual input of commands is required.

The present invention can be more fully understood by reference to the following description and accompanying drawings.

DETAILED DESCRIPTION OF THE PREFERRED EMBODIMENT

As shown in FIGS. 1 and 2, the present invention has a programmed electrode wear compensation device 30 connected with an storage device 10a for roughness of workpiece, electrode dimensions, electrode structure and material, and a storage device 20a for discharge and empirical parameters. Furthermore, a CAD/CAM device 40a generating raw working data is connected with the compensation device 30. The compensation device 30 generates compensated data, which are fed into a control device 50 controlling a working apparatus 60. The compensation device 30 comprises an input interface 31, a computing device 32, and an output interface 33. The input interface 31 is connected with the CAD/CAM device 40. The computing device 32 computes compensation data according to compensation rules. The output interface 33 is placed behind the computing device 32, providing output data. Raw working data generated by the CAD/CAM device 40 are input, compensated, and a working path is calculated and transmitted to the control device 50 for controlling the working apparatus 60.

Thereby, due to compensation of electrode wear and a corrected working path, flatness and roughness of working surfaces are ensured.

The method of the present invention comprises the following five working ways:

1. A 3D groove (as shown in FIG. 10A) is worked by clearing away various 2D layers (as shown in FIGS. 10B and 10C).
2. Each 2D layer is worked in a plane, using crossing working path sections. In an example shown in FIG. 3, the first cut (A) proceeds leftwards, working along the Y-direction, the second cut (D) proceeds downwards, working along the X-direction, the third cut (C) proceeds upwards, working along the X-direction, and the fourth cut (B) proceeds rightwards, working along the Y-direction.
3. For each 2D layer, a ratio r of an electrode diameter and distances of neighboring working paths is determined by 0<r<1, preferably r=0.7.
4. Electrode wear under various conditions is calculated, and compensation data for working are determined, as explained further below.
5. If electrode wear has exceeded a threshold that requires replacing of the electrode, working is halted. Subsequent working after replacing of the electrode is again performed with compensation of electrode wear.

Referring to FIGS. 4A–4D, four calculation methods are employed. In the figures, P denotes a workpiece, Q denotes the electrode, R denotes a displacement of the electrode Q, RM stands for R×0.7, and G denotes a gap.

(1) Electrode wear in Z-direction (vertical): As shown in FIG. 4A, When working in Z-direction, electrode wear compensation needs to be performed according to empirical data and proportional to working depth. As shown in FIGS. 5A and 5B, with vertical working in Z-direction having a depth $\Delta Z$ and a wear rate R1, the electrode wear $\Delta L$ equals $\Delta Z \times R1$. The programmed position in the Z-direction $T_z$ has to consider the electrode wear $\Delta L$, so that $T_z(\Delta Z)=Z-(\Delta Z+\Delta L)=Z-\Delta Z-\Delta Z \times R$.

(2) Within each 2D layer, electrode wear compensation at first cut of the 2D layer: As shown in FIG. 4B, with working taking place in the XY-plane, electrode wear compensation needs to be performed according to empirical data and proportional to working path length. As shown in FIG. 6, with working in X-direction having a path length $\Delta S$ and a wear rate R2, the electrode wear $\Delta L$ equals $\Delta S \times R2$. The programmed position in the Z-direction $T_z$ has to consider the electrode wear $\Delta L$, so that $T_z(\Delta Z)=-\Delta L=Z-\Delta S \times R2$.

(3) Within each 2D layer, electrode wear compensation for distances of neighboring paths being smaller than the diameter of the electrode: As shown in FIGS. 4C and 4D, with working taking place in the XY-plane, but distances of neighboring paths being smaller than the diameter of the electrode, a third method of electrode wear compensation needs to be performed, considering that working paths cross and are according to empirical data and proportional to working path length. As shown in FIG. 6, with working in X-direction having a path length $\Delta S$ and a wear rate R3, the electrode wear $\Delta L$ equals $\Delta S \times R3$. The programmed position in the Z-direction $T_z$ has to consider the electrode wear $\Delta L$, so that $T_z(\Delta Z)=Z-\Delta L=Z-\Delta S \times R3$, similar to the second method of electrode wear compensation. The third method of electrode wear compensation, as compared to the second method thereof, takes into account that working paths cross when setting a value of R3. An empirical value for R3 is R2 multiplied by 0.7 to 0.8.

(4) Electrode wear compensation during fine cut: A fourth method of compensation accounts for relatively small, but not negligible differences and is done in the same way as the third method of compensation. As shown in FIG. 6, with working in X-direction having a path length $\Delta S$ and a wear rate R4, the electrode wear $\Delta L$ equals $\Delta S \times R2$. The programmed position in the Z-direction $T_z$ has to consider the electrode wear $\Delta L$, so that $T_z(\Delta Z)=Z-\Delta L=Z-\Delta S \times R4$.

Referring to FIG. 7, fine cutting is performed downward and in X-direction and upward. FIG. 8 shows electrode wear (Y-axis) versus working path length (X-axis) for various electric discharge energies, with M denoting the largest and N denoting the smallest electric discharge energy in the figure.

R1, R2, R3 and R4 denote electrode wear rates and are dimensionless numbers, being defined as length changes per working depth or working path length. The electrode wear rates are determined according to working conditions. $\Delta S$ denotes the length of any working path in the XY-plane.

FIG. 9 is a flowchart showing calculation of compensated data for electrode wear by the programmed electrode wear compensation device 30. Steps therein comprise: determining crossing of working path sections 81; determining working depth and electrode wear of each layer 82; determining distances of neighboring working path sections 83; for each layer, determining electrode wear due to plane working of the layer, considering overlap of working path sections 84; determining length of electrode 85; input of raw data from CAD/CAM device 86; and input of 3D EDM scanning apparatus data 87. The raw data from the CAD/CAM device are modified to account for electrode wear compensation. Compensated data are fed into the control device 50 for controlling the working apparatus 60.

Referring again to FIG. 2, in an embodiment of the present invention, parameters are selected according to data from a storage device 10 for roughness of workpiece, electrode dimensions, electrode structure and material, and a storage device 20a for discharge and empirical parameters. The CAD/CAM device provides raw data for controlling a working path. The compensation device 30 generates compensated data from the raw data to be transmitted to the control device 50 for controlling the working apparatus 60.

The compensation device 30 comprises an input interface 31, a computing device 32, and an output interface 33. The input interface 31 receives raw data and serves as a user interface. The computing device 32 computes compensation data according to raw data received by the input interface 31 and working path, crossing of sections thereof, distances of neighboring sections thereof, working depth and electrode wear for each layer, considering overlapping of sections of the working path. The output interface 32 transmits compensated data to the control device 50.

While the invention has been described with reference to a preferred embodiment thereof, it is to be understood that modifications or variations may be easily made without departing from the spirit of this invention which is defined by the appended claims.

Figure 1:
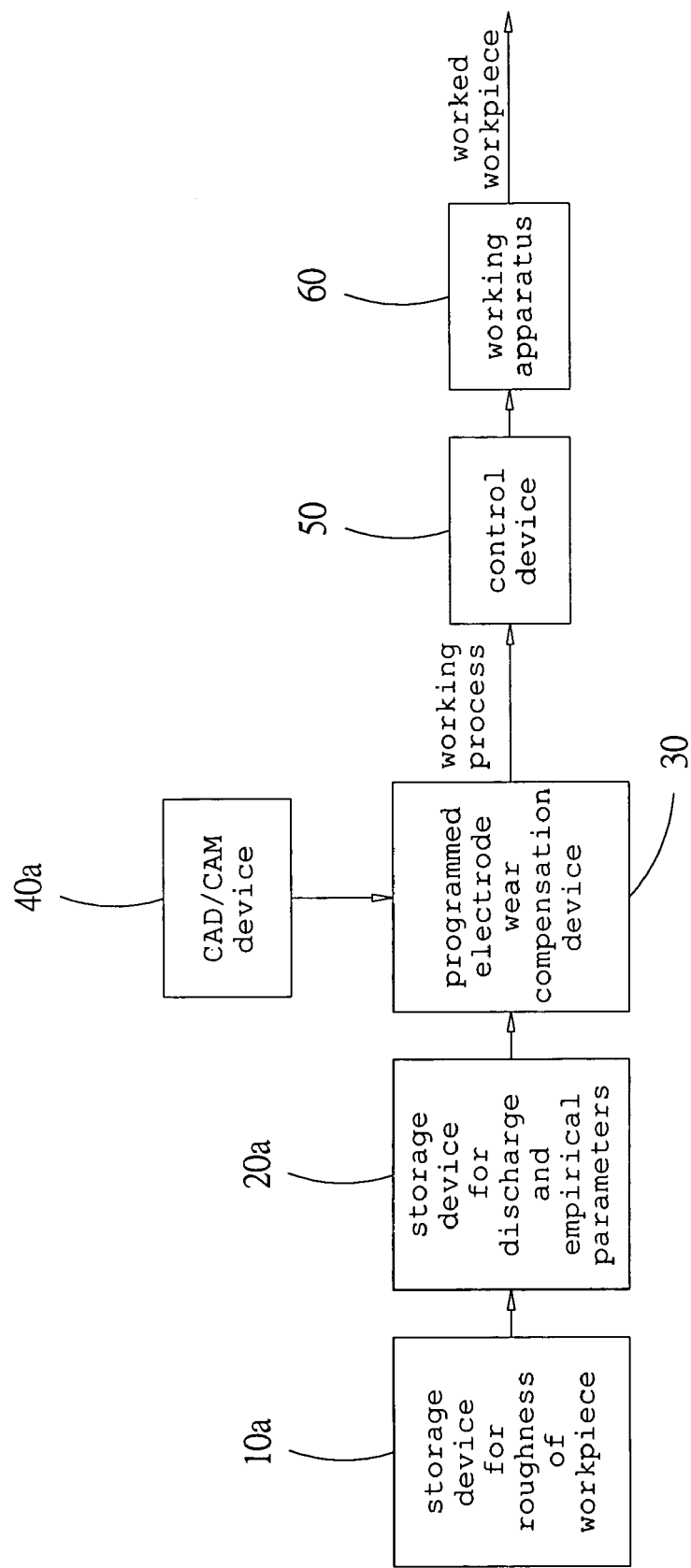
FIG. 1 is a schematic diagram of the programmed electrode wear compensation device for a 3D EDM scanning apparatus of the present invention.
Figure 2:
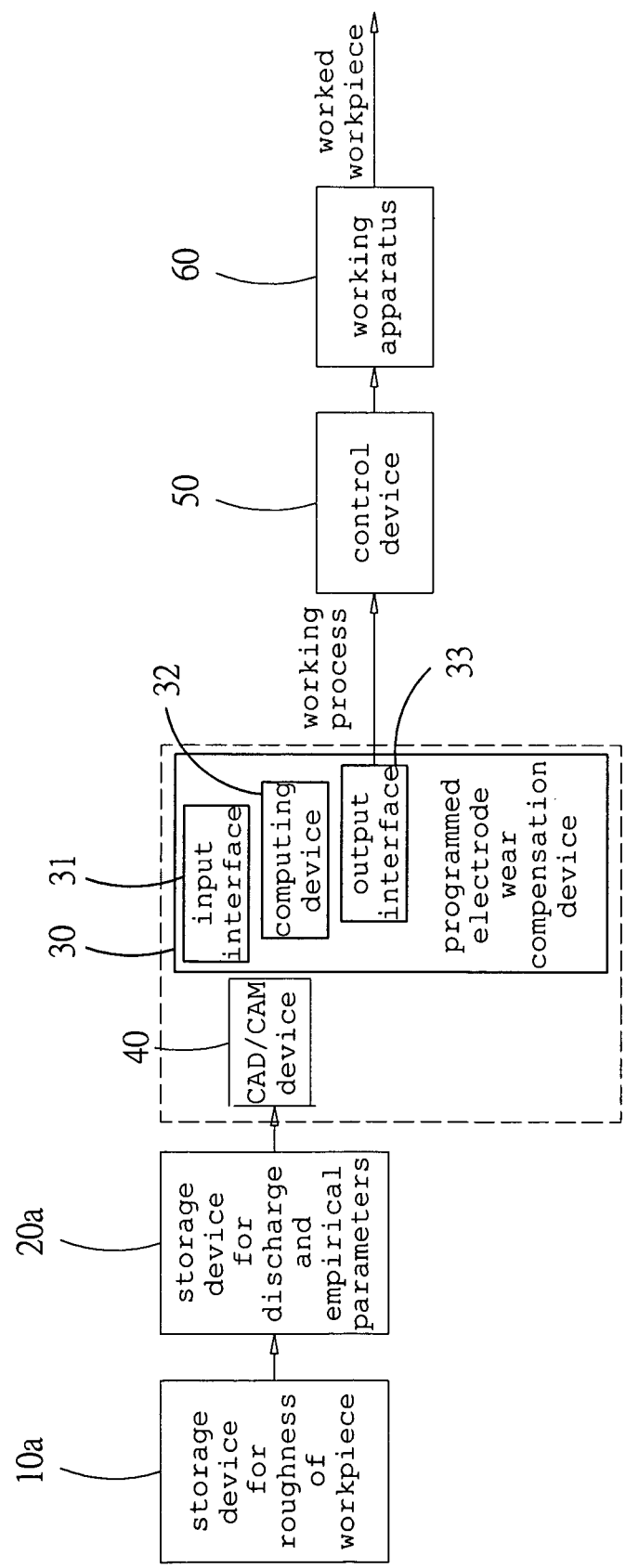
FIG. 2 is a schematic diagram of the programmed electrode wear compensation device for a 3D EDM scanning apparatus of the present invention in an embodiment.
Figure 3:
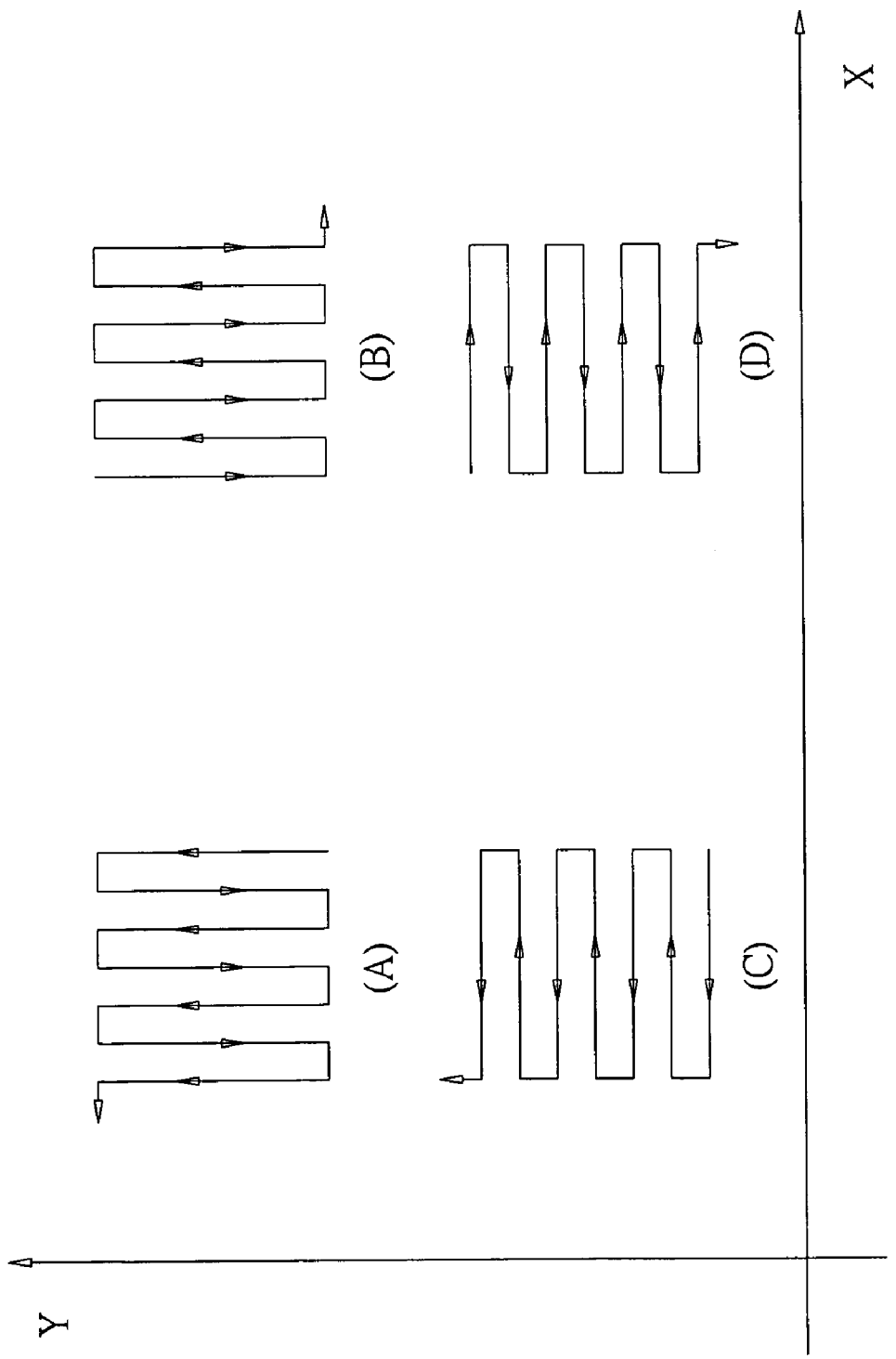
FIG. 3 is a schematic illustration of plane working paths of the present invention.
Figure 4A:
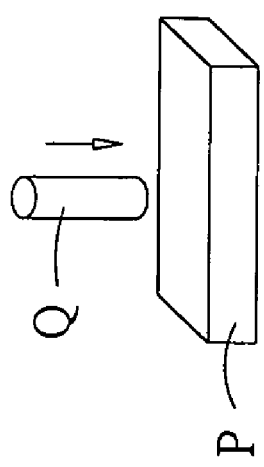
FIGS. 4A–4D are schematic illustrations of various ways of electrode wear.
Figure 4B:
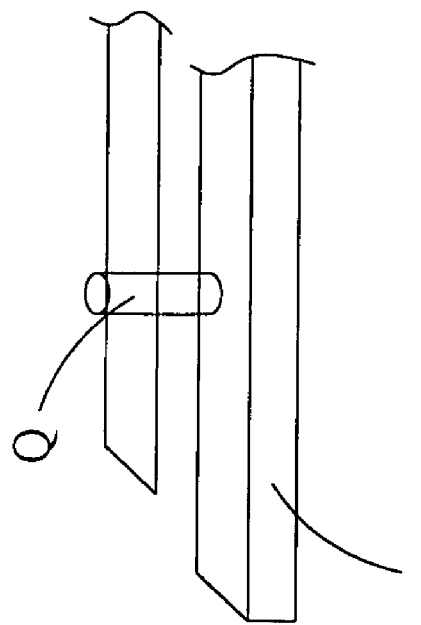
Figure 4C:
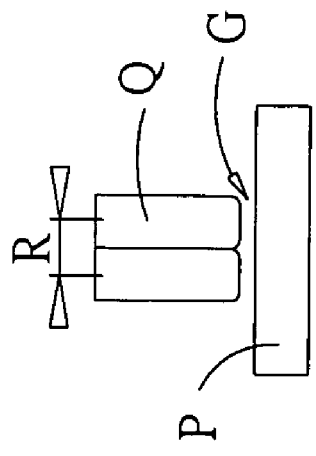
Figure 4D:
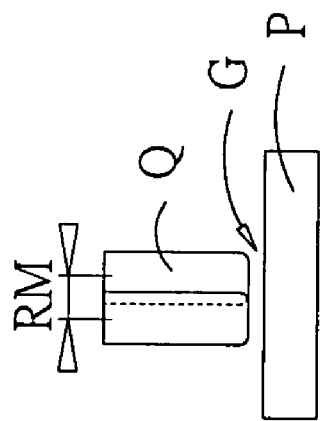
Figure 5B:
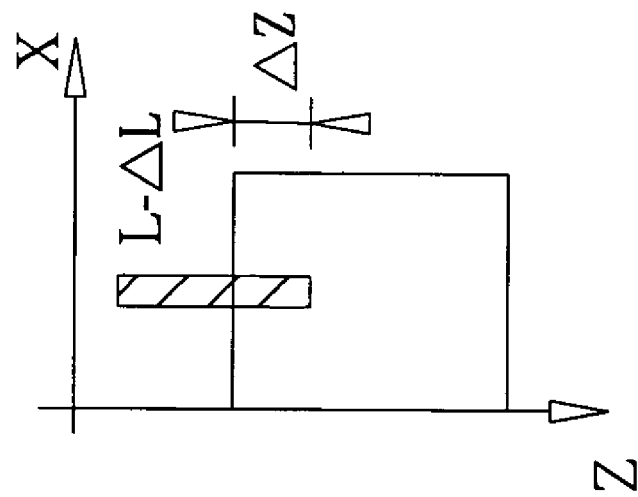
FIGS. 5A and 5B are schematic illustrations of electrode wear compensation with a vertical working path.
Figure 5A:
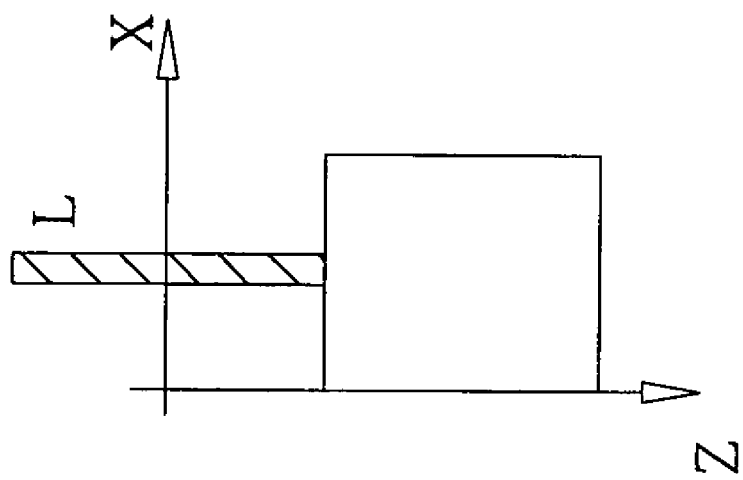
Figure 6:
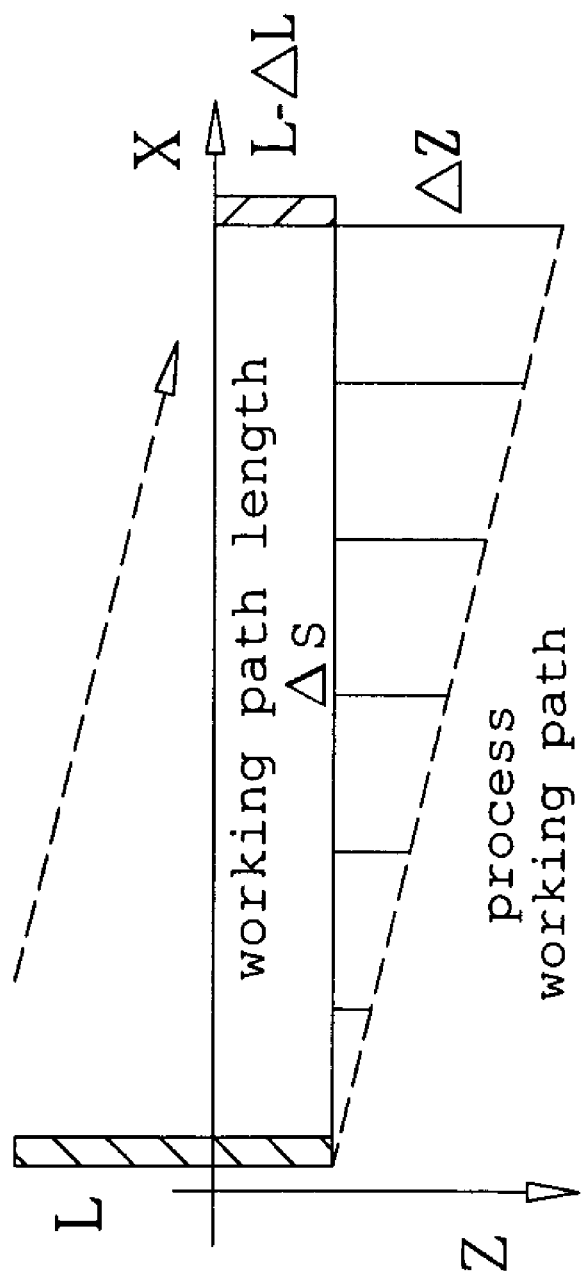
FIG. 6 is schematic illustration of electrode wear compensation with a horizontal working path.
Figure 8:
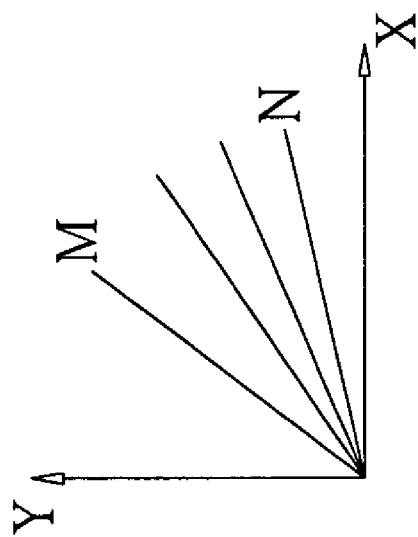
FIG. 8 is a plot of electrode wear against working path length for various electric discharge energies.
Figure 7:
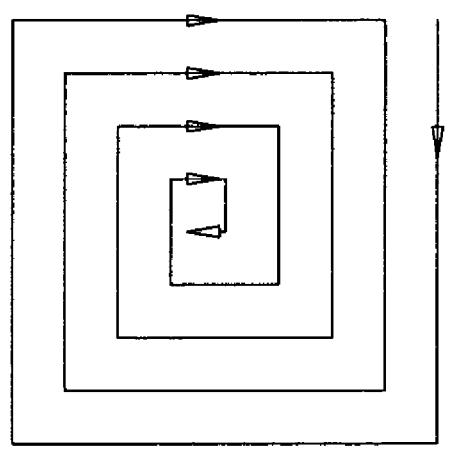
FIG. 7 is a schematic illustration of a fine cutting working path of the present invention.
Figure 9:
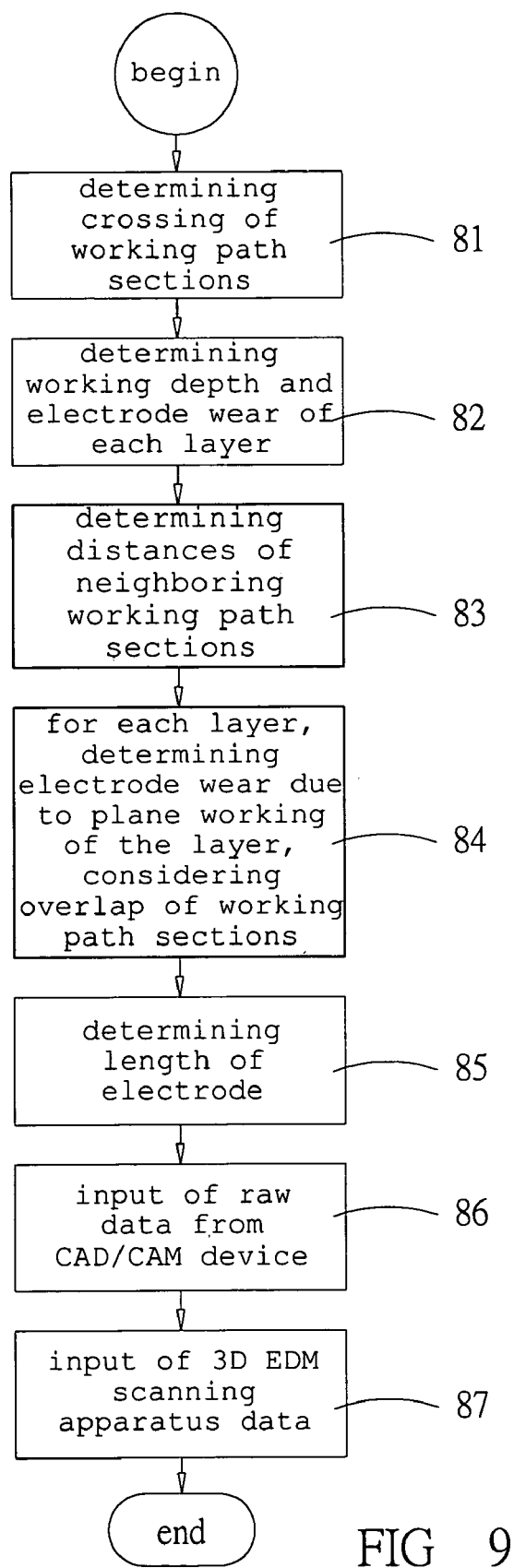
FIG. 9 is a flowchart of the programmed electrode wear compensation method of the present invention.
Figure 10C:
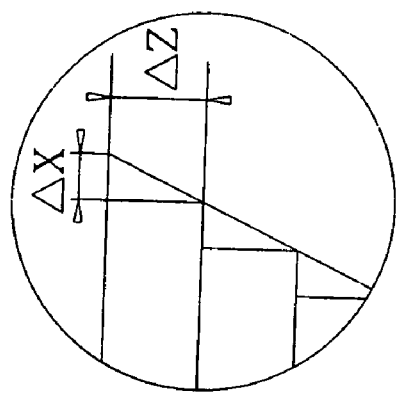
FIGS. 10A–10C are schematic illustrations of cutting a groove in layers.
Figure 10B:
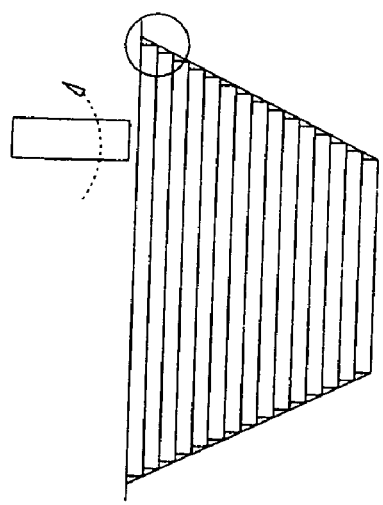
Figure 10A:
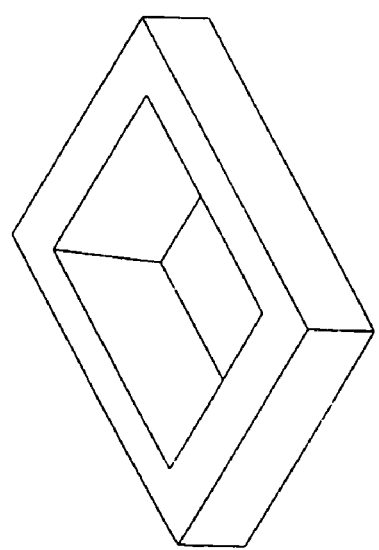
Figure 11:
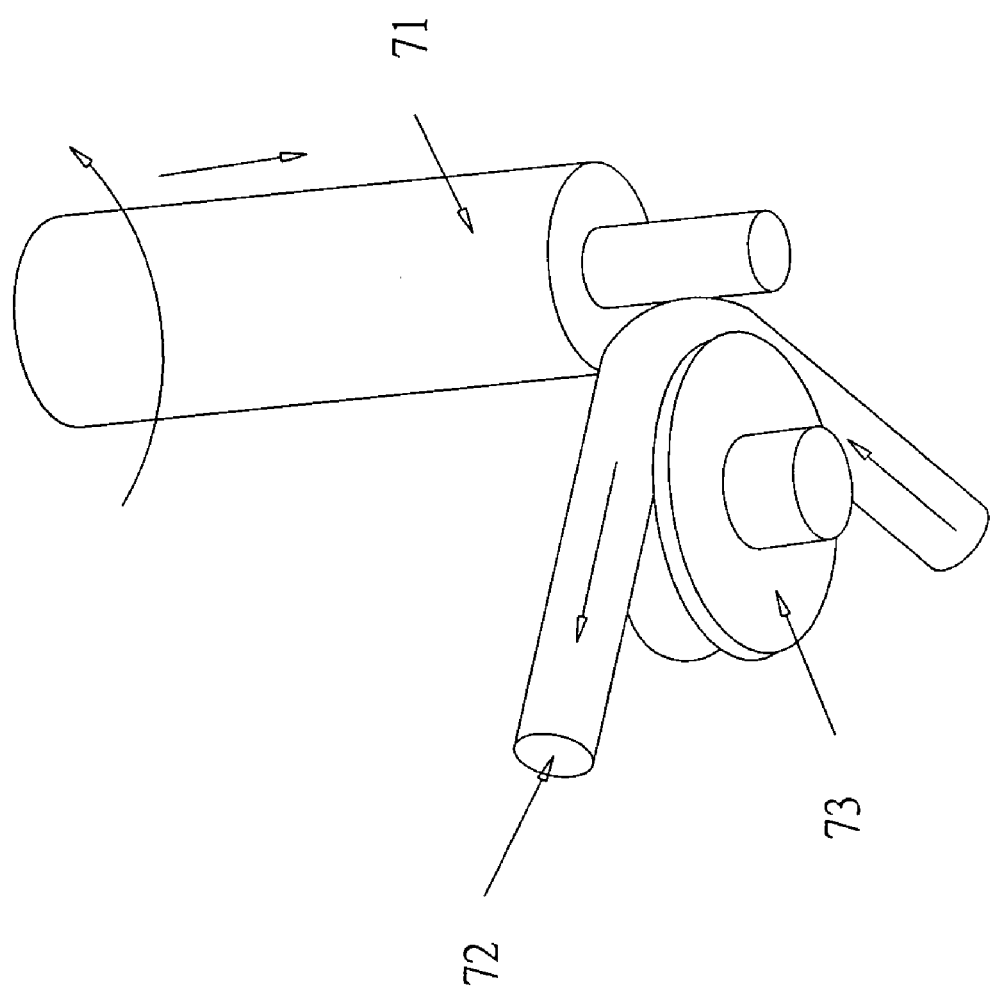
FIG. 11 is a perspective view of a WEDG device.

The invention claimed is:

1. A programmed electrode wear compensation device for a 3D EDM scanning apparatus, operating in conjunction with a storage device for roughness of workpiece, electrode dimensions, electrode structure and material, a storage device for discharge and empirical parameters and a CAD/CAM device, said programmed electrode wear compensation device comprising:
   an input interface, which is a user interface and is connected with said CAD/CAM device, receiving raw data therefrom;
   a computing device, calculating from said raw data compensated data for a working oath which is corrected for electrode wear; and
   an output interface, transmitting said compensated data to a control device controlling a working apparatus;
   wherein said compensated data include compensation rules for electrode wear, said raw data and manually input compensation data; and
   wherein said compensation rules comprise
   (a) working a 3D groove by clearing away various 2D layers;
   (b) working each 2D layer in a plane, using crossing working path sections;
   (c) for each 2D layer, setting a ratio r of an electrode diameter and distances of neighboring working paths by 0<r<1, preferably r=0.7;
   (d) calculating electrode wear compensation data for
      (1) working perpendicularly to said layers,
      (2) for each layer, working in a first cut,
      (3) for each layer, where distances between working path sections are smaller than a diameter of said electrode,
      (4) fine cutting; and
   (e) halting working, if electrode wear has exceeded a threshold that requires replacing of the electrode, resuming working after replacing of the electrode is again performed with compensation of electrode wear.

2. The programmed electrode wear compensation device for a 3D EDM scanning apparatus according to claim 1, wherein said electrode wear compensation data are calculated for
   (a) working perpendicularly to said layers by compensating for electrode wear proportional to a working depth,
   (b) for each layer, working in a first cut, by compensating for electrode wear proportional to a working path length,
   (c) for each layer, where distances between working path sections are smaller than a diameter of said electrode, by compensating for electrode wear proportional to a reduced working path length; and
   (d) fine cutting, by compensating for electrode wear proportional to a working path length.

3. A programmed electrode wear compensation method for a 3D EDM scanning apparatus, comprising the steps of
   (a) obtaining data about roughness of a workpiece;
   (b) obtaining discharge and empirical parameters;
   (c) connecting with a CAD/CAM device delivering raw data;
   (d) obtaining compensated data for a working path considering electrode wear;
   (e) transmitting said compensated data to a control device; and
   (f) working said workpiece by a working apparatus controlled by said control device on the basis of said compensated data.

4. The programmed electrode wear compensation method for a 3D EDM scanning apparatus according to claim 3, wherein compensated data are obtained by
   (a) receiving of parameters and said raw data by an input interface;
   (b) calculating compensated data according to compensation rules; and
   (c) transmitting said compensated data to an output interface.

5. The programmed electrode wear compensation method for a 3D EDM scanning apparatus according to claim 4, wherein receiving of parameters and said raw data by said input interface comprises the steps of
   (a) determining crossing of working path sections;
   (b) determining working depth and electrode wear of each layer;
   (c) determining distances of neighboring working path sections;
   (d) for each layer, determining electrode wear due to plane working of the layer, considering overlap of working path sections;

(e) determining length of electrode;
(f) input of raw data from CAD/CAM device; and
(g) input of 3D EDM scanning apparatus data.

6. The programmed electrode wear compensation method for a 3D EDM scanning apparatus according to claim 5, wherein working is performed in parallel layers which define planes with an X-direction and a Y-direction, with a working path in each layer being divided into four cuts, a first of said four cuts being performed back and forth in said Y-direction, proceeding opposite to said X-direction, a second of said four cuts being performed
back and forth in said X-direction, proceeding opposite to said Y-direction, a third of said four cuts being performed back and forth in said Y-direction, proceeding along said X-direction, and a fourth of said four cuts being performed back and forth in said X-direction, proceeding along said Y-direction.

7. The programmed electrode wear compensation method for a 3D EDM scanning apparatus according to claim 4, wherein said compensation rules comprise
   (a) working a 3D groove by clearing away various 2D layers;
   (b) working each 2D layer in a plane, using crossing working path sections;
   (c) for each 2D layer, setting a ratio r of an electrode diameter and distances of neighboring working paths by 0<r<1, preferably r=0.7;
   (d) calculating electrode wear compensation data for
       (1) working perpendicularly to said layers,
       (2) for each layer, working in a first cut,
       (3) for each layer, where distances between working path sections are smaller than a diameter of said electrode,
       (4) fine cutting; and
   (e) halting working, if electrode wear has exceeded a threshold that requires replacing of the electrode, resuming working after replacing of the electrode is again performed with compensation of electrode wear.

8. The programmed electrode wear compensation method for a 3D EDM scanning apparatus according to claim 7, wherein said electrode wear compensation data are calculated for
   (a) working perpendicularly to said layers by compensating for electrode wear proportional to a working depth,
   (b) for each layer, working in a first cut, by compensating for electrode wear proportional to a working path length,
   (c) for each layer, where distances between working path sections are smaller than a diameter of said electrode, by compensating for electrode wear proportional to a reduced working path length; and
   (d) fine cutting, by compensating for electrode wear proportional to a working path length.

* * * * *